March 21, 1933.　　　L. H. KAUPKE　　　1,902,243
HAY LOADER
Filed April 30, 1928　　　3 Sheets-Sheet 3
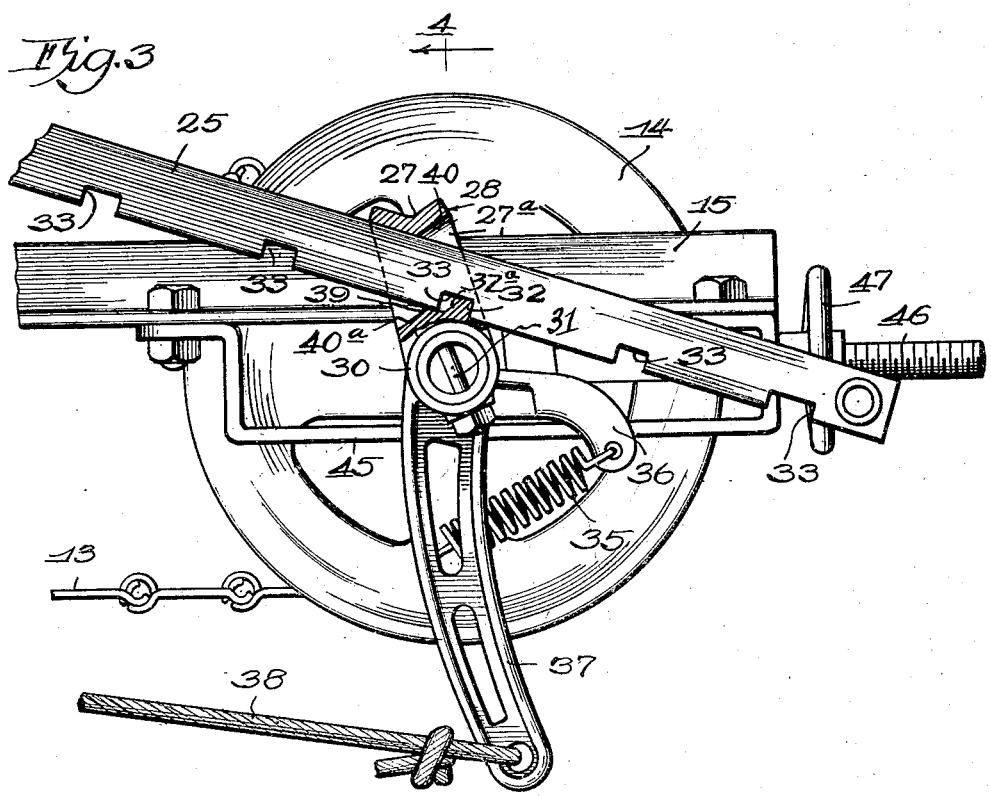
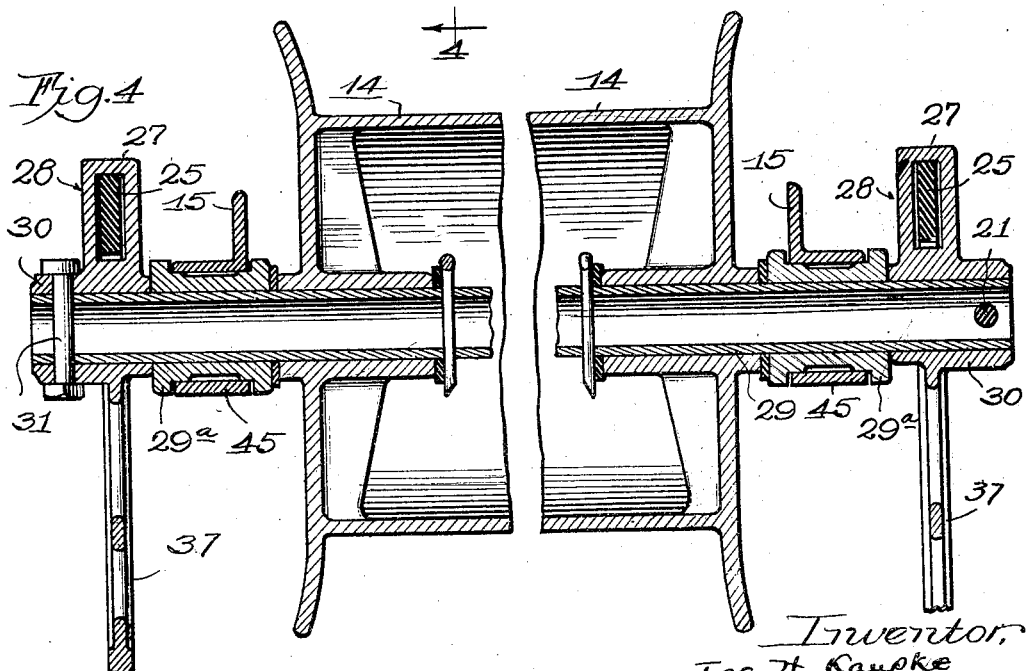

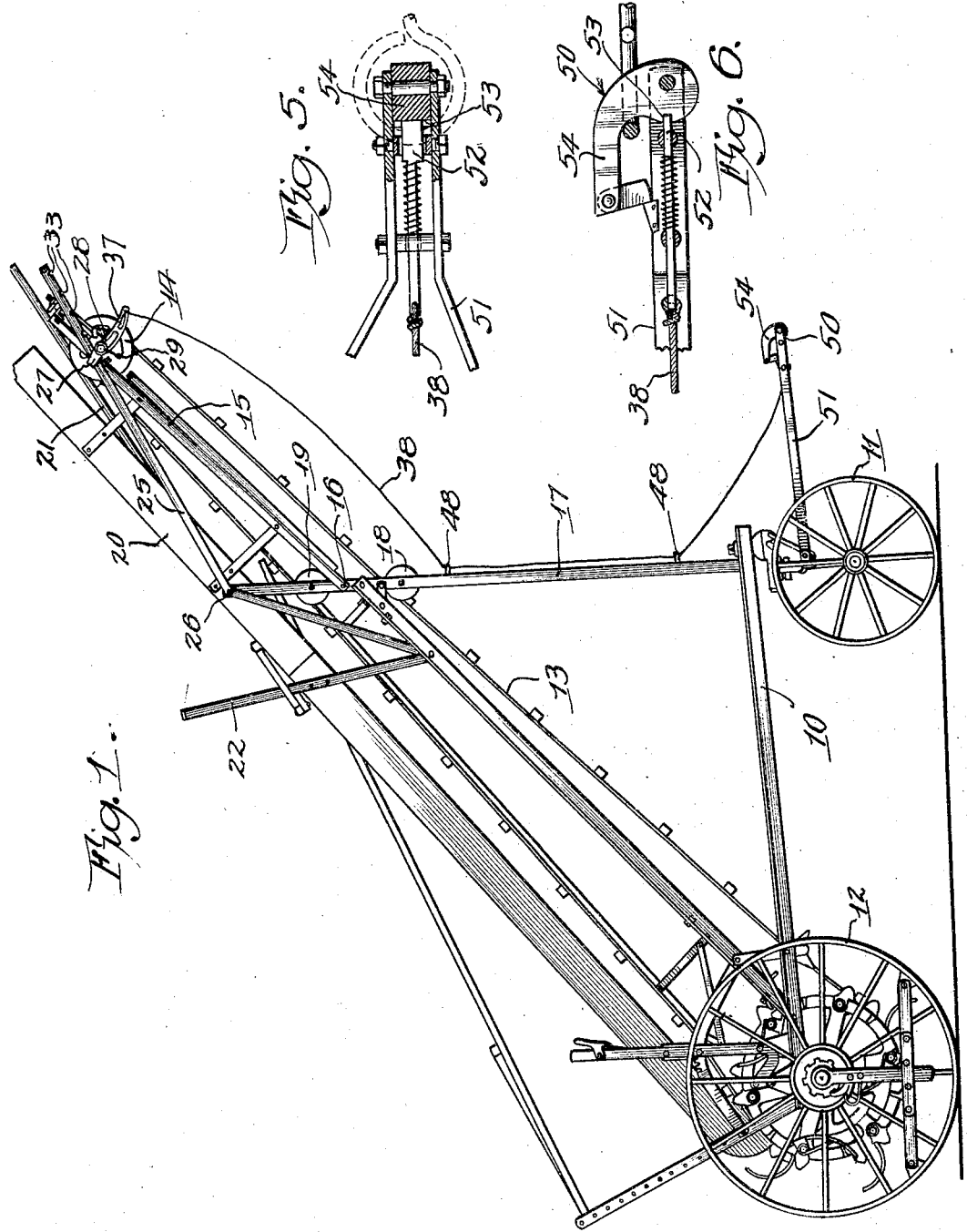

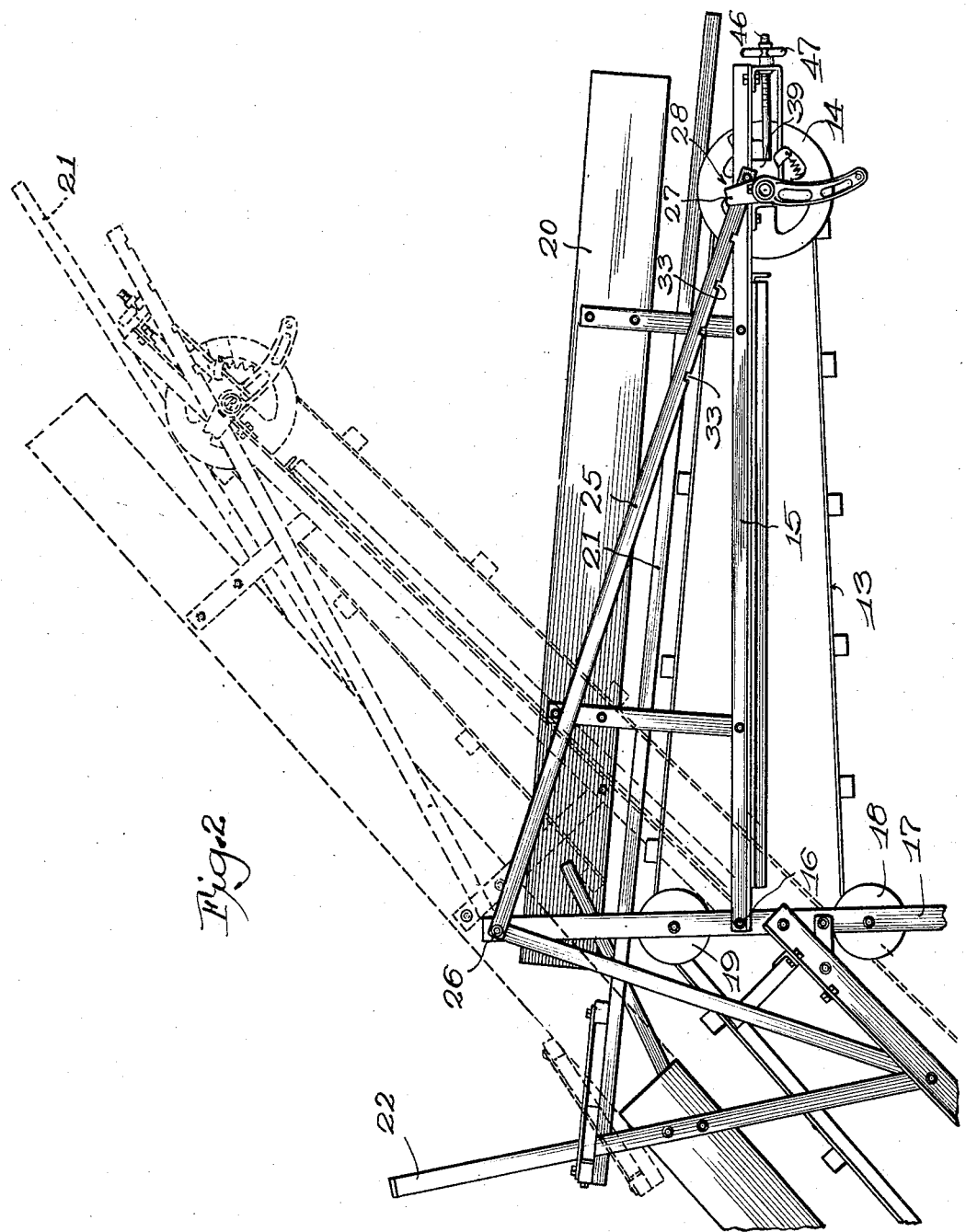

Patented Mar. 21, 1933

1,902,243

UNITED STATES PATENT OFFICE

LEE H. KAUPKE, OF ROCK ISLAND, ILLINOIS, ASSIGNOR TO THE ROCK ISLAND PLOW COMPANY, OF ROCK ISLAND, ILLINOIS, A CORPORATION OF ILLINOIS

HAY LOADER

Application filed April 30, 1928. Serial No. 273,850.

My invention consists in certain improvements in the construction of elevator hay loaders, and more particularly to loaders of the type provided with an upper jointed or hinged conveyor section, and has for its principal object to provide an improved construction and operation of locking devices for maintaining the hinged portion in its several positions of adjustment.

In carrying out my invention I provide an improved and simplified construction of locking mechanism whereby locking devices are provided at both sides of the elevator and means are provided for simultaneously releasing both locking devices, said releasing means being controlled from either side of the elevator. I also provide means whereby the control line which operates the elevator releasing latch is also connected for releasing the latch of the hay loader hitch. Other features of construction will appear from time to time as the description proceeds.

The invention may best be understood by reference to the accompanying drawings, in which Figure 1 is a side view of my improved hay loader in its entirety.

Figure 2 is an enlarged detail view of the upper end of the elevator, showing the hinged portion in full lines in lowered position, and in dotted lines in raised position.

Figure 3 is an enlarged end view of the upper elevator roller bearing shaft, showing the locking means associated therewith, with parts broken away.

Figure 4 is a section taken on line 4—4 of Figure 3 with intermediate parts of the roller shaft omitted, and Figures 5 and 6 are enlarged detail views showing the latching means for the draft hitch.

As shown in Figure 1, my improved hay loader is of a type now in general use in so far as it consists of a frame 10 carried at the front by truck wheels 11 and at the rear by drive wheels 12, so called because they drive the rake cylinder and through the rake cylinder drive the endless conveyor 13 which passes around the rake cylinder and around idler rollers or wheels 14 at the top of the elevator. Details of construction of the rake cylinder and its driving connection with the wheels 12 need not be described in detail herein, as it forms no part of the present invention.

Referring now to the hinged construction of the upper end of the elevator, it will be seen from Figure 1 that a frame section 15 at the upper end of the elevator is hinged at 16 to a pair of upright frame members 17 forming part of the main frame 10. The conveyor 13 passes over rollers 18 and 19 mounted between upright frame members 17, 17 so as to change the course of direction of said conveyor at this point when the frame member 15 is in lowered position, as shown in full lines in Figure 2. The hinged frame 15 carries side boards 20, 20 at opposite sides thereof, and suitable compression members are also provided for the hinged section, herein consisting of slats 21, 21 having hinged connection on a separate upright 22 on the main frame, and arranged to cooperate with the upper flight of the conveyor in both raised and lowered position.

Referring now more particularly to the latching device for maintaining the hinged conveyor in its several permissible positions, I provide a pair of locking bars 25, 25 hinged on pins 26, 26 at the upper end of each of the upright frame members 17. These bars each extend through an upright lug 27 carried on locking members 28 mounted on the two ends of a shaft 29 extending the full width of the upper end of the conveyor. This shaft also forms the bearing support for the idler rollers 14, 14 over which the upper end of the endless conveyor 13 is trained.

Referring now to details of the locking members, best shown in Figures 3 and 4, said members consist of a sleeve 30 fixed on opposite ends of the shaft 29 by any suitable means, such as bolts 31. The locking members 28, 28 are identical, so that the description of one suffices for an understanding of both. Each locking lug 27, heretofore referred to, is integral with the sleeve 30 and has a slot or aperture 27a through which the locking bar 25 extends. A latch tooth 32 projects upwardly from the lower face of slot 27a adjacent the outer end thereof, and is adapted to be selectively engaged in notches 33, 33 formed in the lower edge of the locking bar 25. Several of such notches may be provided to afford various positions of adjustment between the fully extended or upright position of the elevator, and a substantially horizontal position thereof, the two extremes being indicated in dotted and full lines in Figure 2.

The locking members 28 are normally maintained in position so that the latch tooth 32 engages the notches 33 by means of a spring 35, herein fixed at one end to an arm 36 projecting forwardly from a bearing 29a of shaft 29 at its rearward end to an operating lever 37 depending from and integral with the locking members 28. The lever 37 is actuated by a suitable rope 38, or its equivalent, connected to the lower end thereof, or directly by hand, on either side of the elevator.

As will be seen from Figure 3, the lower surface of the slot 27a is provided with a raised cam surface 39 near the center of said slot. The arrangement is such that by rotation of the locking member 28 in a clockwise direction, the cam surface 39 in engagement with the lower surface of locking bar 25 raises the same so as to disengage the latch tooth 32 from its respective notch 33 as the relative angular position of the locking member and said bar is changed, with the result that the locking bar 25 is then comparatively free to slide through the slot 27a so long as the lower end of the lever 37 is held in a rearward position. It will be observed further, that the upper surface 40 of the slot 27a opposite the latch tooth 32 and the lower surface 40a rearwardly of said tooth, are flared outwardly and in effect form a brake against the upper and lower surfaces of the bar 25 when the locking member is further rotated in a clockwise direction.

It will now be clear that the locking member 28 may be rotated in position to unlatch the tooth 32 and permit the hinged portion of the elevator to be raised or lowered to any desired position, and if desired, further pressure may be exerted upon the locking member 28 so as to affect a braking action on the bar 25, and thus permit the gradual lowering of the hinged section under the complete control of the operator.

It will be seen further that the rear surface of latch tooth 32 is inclined rearwardly so that when the elevator is raised by hand said latch tooth is automatically released to any higher position.

It will be seen further from the above description that two locking members 28, 28 at opposite sides of the elevator are both mounted on roller shaft 29 and therefore are controlled by either lever 37 at opposite sides of the elevator. Accordingly, the latching devices at both sides of the elevator are released simultaneously for raising and lowering both sides of the elevator, in the several adjustable positions relative to their respective locking bars 25.

In the preferred form shown the entire locking mechanism including cross shaft 29 is carried in bearings 29a, 29a which are slidable to adjust the tension on the endless conveyor 13 by any suitable means provided for this purpose. In the form shown, said bearings are slidable in slots formed between frame member 15 and brackets 45, 45 connected thereto, the position of said bearings 29a being adjustable by means of a threaded screw 46 connected to the respective bearings and extending forwardly through the bracket 45 and having manual adjusting member 47 thereon, as is clearly shown in Figures 2 and 3.

The control or actuating line 38 is connected to one of the levers 37, and is preferably led downwardly along the adjacent upright 17, for this purpose being threaded through suitable guides such as eyelets 48, 48 and thence forwardly to the detachable draft hitch 50 carried on tongue 51 of the hay loader. This draft hitch may be of any detachable type such as is generally used with loaders of this character, herein including a spring pressed latch member 52 engaging a slot 53 in the rear face of the locking member 54 pivotally mounted on the tongue 50, as shown in Figures 1 and 5. By withdrawing latch member 52 against tension of its spring from the notch 53 the member 54 is free to be swung forwardly and thus release the hay loader from its draft connection with the hay rack to which it is normally hitched during loading operation.

With this arrangement, therefore, it will be seen that the same rope which is utilized for releasing the hay loader hitch from the hay rack by an operator located on said rack, is also utilized for manipulating the elevator latch and locking means, by an operator located either on the ground or on the hay rack.

What is claimed is:—

1. In an apparatus of the class described, a main frame, an elevator having hinged upper portions and locking means at the outer end of said elevator including a locking bar pivotally supported on said main frame, a locking member on said hinged portion through which said locking bar extends, said locking member having means engageable with said locking bar in one position of rotation of said locking member and releasable by rotation of the latter in another position, said locking member also carrying bearing surfaces affording braking action on said locking bar when said locking member is rotated into unlocking position.

2. In an apparatus of the class described, a main frame, an elevator having a hinged upper portion, locking means at opposite sides of said upper portion adjacent the outer end thereof, locking bars pivoted at opposite sides of said main frame, each being slidably engaged and selectively adjustable relative to its respective locking member, and means for simultaneously operating said locking members from either side of said hinged portion.

Signed at Chicago, Ill., this 20th day of April, 1928.

LEE H. KAUPKE.